United States Patent
Rhoads et al.

(10) Patent No.: US 6,424,725 B1
(45) Date of Patent: Jul. 23, 2002

(54) DETERMINING TRANSFORMATIONS OF MEDIA SIGNALS WITH EMBEDDED CODE SIGNALS

(75) Inventors: Geoffrey B. Rhoads, West Linn; Ravi K. Sharma, Hillsboro, both of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/566,533

(22) Filed: May 8, 2000

Related U.S. Application Data

(63) Continuation-in-part of application No. 09/452,023, filed on Nov. 30, 1999, and a continuation-in-part of application No. 08/746,613, filed on Nov. 12, 1996, now Pat. No. 6,122,403, and a continuation-in-part of application No. 09/186,962, filed on Nov. 5, 1998, which is a continuation of application No. 08/649,419, filed on May 16, 1996, now Pat. No. 5,862,260.

(51) Int. Cl.⁷ .................................................. G06K 9/00
(52) U.S. Cl. ................................................... 382/100
(58) Field of Search ............................. 382/100, 232, 382/284; 395/135; 358/454, 448, 450, 142, 124; 380/4, 23, 24; 283/6, 93, 94; 348/475; 235/494

(56) References Cited

U.S. PATENT DOCUMENTS

| | | |
|---|---|---|
| 2,630,525 A | 3/1953 | Tomberlin et al. |
| 3,493,674 A | 2/1970 | Houghton |
| 3,562,420 A | 2/1971 | Thompson |
| 3,569,619 A | 3/1971 | Simjian |
| 3,585,290 A | 6/1971 | Sanford |

(List continued on next page.)

FOREIGN PATENT DOCUMENTS

| | | |
|---|---|---|
| DE | 2943436 | 5/1981 |
| DE | 3806411 | 9/1989 |
| EP | 058 482 | 8/1982 |
| EP | 366 381 | 5/1990 |
| EP | 372 601 | 6/1990 |

(List continued on next page.)

OTHER PUBLICATIONS

Daugman, J.G. "Complete discrete 2–D Gabor transforms by neural networks for image analysis and compression", Acoustics, Speech and Signal Processing, IEEE Transactions on, vol. 36 Issue 78, Jul. 1988, pp. 1169–1179.*

Boland et al., "Watermaking Digital Images for Copyright Protection", Image Processing and its Applications, Jul. 4–6, 1995, pp. 326–330.*

Ó Ruanaidh, J.J.K. O et al., "Watermarking digital images for copyright protection", IEE Proc–Vis. Image Signal Process., vol. 143, No. 4, Aug. 1996, pp. 250–256.*

Ó J.J.K. O et al., "Phase Watermarking of digital images", IEEE 1996, pp. 239–242.*

(List continued on next page.)

Primary Examiner—Jose L. Couso
(74) Attorney, Agent, or Firm—Joel R. Meyer; Digimarc Corporation

(57) ABSTRACT

An embedded signal detection process determines a transformation of a media signal subsequent to the encoding of an embedded code signal into the media signal. The process performs a logarithmic sampling of the media signal to create a sampled signal in which scaling of the media signal is converted to translation in the sampled signal. It then computes the translation of the embedded code signal in the sampled signal to determine scaling of the media signal subsequent to the encoding of the embedded signal in the media signal.

28 Claims, 5 Drawing Sheets

U.S. PATENT DOCUMENTS

| | | |
|---|---|---|
| 3,655,162 A | 4/1972 | Yamamoto et al. |
| 3,703,628 A | 11/1972 | Philipson, Jr. |
| 3,805,238 A | 4/1974 | Rothfjell |
| 3,809,806 A | 5/1974 | Walker et al. |
| 3,838,444 A | 9/1974 | Loughlin et al. |
| 3,845,391 A | 10/1974 | Crosby |
| 3,914,877 A | 10/1975 | Hines |
| 3,922,074 A | 11/1975 | Ikegami et al. |
| 3,971,917 A | 7/1976 | Maddox et al. |
| 3,982,064 A | 9/1976 | Barnaby |
| 3,984,624 A | 10/1976 | Waggener |
| 4,025,851 A | 5/1977 | Haselwood et al. |
| 4,179,586 A * | 12/1979 | Mathews, Jr. et al. ... 179/1.5 R |
| 4,225,967 A | 9/1980 | Miwa et al. |
| 4,230,990 A | 10/1980 | Lert, Jr. et al. |
| 4,231,113 A | 10/1980 | Blasbalg |
| 4,237,484 A | 12/1980 | Brown |
| 4,238,849 A | 12/1980 | Gassmann |
| 4,252,995 A | 2/1981 | Schmidt et al. |
| 4,262,329 A | 4/1981 | Bright et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,423,415 A | 12/1983 | Goldman |
| 4,425,642 A | 1/1984 | Moses et al. |
| 4,425,661 A | 1/1984 | Moses et al. |
| 4,476,468 A | 10/1984 | Goldman |
| 4,495,620 A | 1/1985 | Steele et al. |
| 4,528,588 A | 7/1985 | Löfberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Löfberg |
| 4,637,051 A | 1/1987 | Clark |
| 4,639,779 A | 1/1987 | Greenberg |
| 4,644,582 A | 2/1987 | Morishita et al. |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Cause D'Aggraives et al. |
| 4,677,466 A | 6/1987 | Lert, Jr. et al. |
| 4,682,794 A | 7/1987 | Margolin |
| 4,697,209 A | 9/1987 | Kiewit et al. |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Blüthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,827,508 A | 5/1989 | Shear |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,903,301 A | 2/1990 | Kondo et al. |
| 4,908,836 A | 3/1990 | Rushforth et al. |
| 4,908,873 A | 3/1990 | Philibert et al. |
| 4,920,503 A | 4/1990 | Cook |
| 4,921,278 A | 5/1990 | Shiang et al. |
| 4,939,615 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka |
| 4,996,530 A | 2/1991 | Hilton |
| 5,008,752 A * | 4/1991 | Van Nostrand ............. 358/160 |
| 5,010,405 A | 4/1991 | Schrieber et al. |
| 5,027,401 A | 6/1991 | Soltesz |
| 5,036,513 A | 7/1991 | Greenblatt |
| 5,040,059 A * | 8/1991 | Leberl |
| 5,050,213 A | 9/1991 | Shear |
| 5,063,446 A | 11/1991 | Gibson |
| 5,063,604 A * | 11/1991 | Weiman ...................... 382/41 |
| 5,067,019 A * | 11/1991 | Juday et al. ................. 358/160 |
| 5,073,899 A | 12/1991 | Collier et al. |
| 5,075,773 A | 12/1991 | Pullen |
| 5,077,608 A | 12/1991 | Dubner |
| 5,077,795 A | 12/1991 | Rourke et al. |
| 5,079,648 A | 1/1992 | Maufe |
| 5,083,224 A | 1/1992 | Hoogendoorn et al. |
| 5,086,469 A | 2/1992 | Gupta et al. |
| 5,091,966 A | 2/1992 | Bloomberg et al. |
| 5,095,196 A | 3/1992 | Miyata |
| 5,103,306 A * | 4/1992 | Weiman ..................... 358/133 |
| 5,103,459 A | 4/1992 | Gilhousen et al. |
| 5,113,437 A | 5/1992 | Best |
| 5,128,525 A | 7/1992 | Stearns et al. |
| 5,134,496 A | 7/1992 | Schwab et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,146 A | 12/1992 | Bloomberg |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,200,993 A | 4/1993 | Wheeler et al. |
| 5,212,551 A | 5/1993 | Conanan |
| 5,213,337 A | 5/1993 | Sherman |
| 5,228,056 A | 7/1993 | Schilling |
| 5,243,423 A | 9/1993 | DeJean et al. |
| 5,245,165 A | 9/1993 | Zhang |
| 5,245,329 A | 9/1993 | Gockebay |
| 5,247,364 A | 9/1993 | Banker et al. |
| 5,253,078 A | 10/1993 | Balkanski et al. |
| 5,257,199 A | 10/1993 | Funada et al. |
| 5,258,998 A | 11/1993 | Koide |
| 5,259,025 A | 11/1993 | Monroe |
| 5,267,334 A | 11/1993 | Normille et al. |

| Patent No. | Date | Inventor |
|---|---|---|
| 5,278,400 A | 1/1994 | Appel |
| 5,280,537 A | 1/1994 | Sugiyama et al. |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,315,448 A | 5/1994 | Ryan |
| 5,319,453 A | 6/1994 | Copriviza |
| 5,319,724 A | 6/1994 | Blonstein et al. |
| 5,319,735 A | 6/1994 | Preuss et al. |
| 5,325,167 A | 6/1994 | Melen |
| 5,327,237 A | 7/1994 | Gerdes et al. |
| 5,337,361 A | 8/1994 | Wang et al. |
| 5,337,362 A | 8/1994 | Gormish et al. |
| 5,349,655 A | 9/1994 | Mann |
| 5,351,302 A | 9/1994 | Leighton et al. |
| 5,374,976 A | 12/1994 | Spannenburg |
| 5,379,345 A | 1/1995 | Greenberg |
| 5,387,941 A | 2/1995 | Montgomery et al. |
| 5,394,274 A | 2/1995 | Kahn |
| 5,396,559 A | 3/1995 | McGrew |
| 5,398,283 A | 3/1995 | Virga |
| 5,404,160 A | 4/1995 | Schober et al. |
| 5,404,377 A | 4/1995 | Moses |
| 5,408,542 A | 4/1995 | Callahan |
| 5,410,598 A | 4/1995 | Shear |
| 5,418,853 A | 5/1995 | Kanota et al. |
| 5,422,963 A | 6/1995 | Chen et al. |
| 5,422,995 A | 6/1995 | Aoki et al. |
| 5,425,100 A | 6/1995 | Thomas et al. |
| 5,428,606 A | 6/1995 | Moskowitz |
| 5,428,607 A | 6/1995 | Hiller et al. |
| 5,432,542 A | 7/1995 | Thibadeau et al. |
| 5,432,870 A | 7/1995 | Schwartz |
| 5,446,273 A | 8/1995 | Leslie |
| 5,450,122 A | 9/1995 | Keene |
| 5,450,490 A | 9/1995 | Jensen et al. |
| 5,459,586 A * | 10/1995 | Nagasato et al. ............ 358/450 |
| 5,461,426 A | 10/1995 | Limberg et al. |
| 5,469,222 A * | 11/1995 | Sprague |
| 5,469,506 A | 11/1995 | Berson |
| 5,473,631 A | 12/1995 | Moses |
| 5,479,168 A | 12/1995 | Johnson et al. |
| 5,481,294 A | 1/1996 | Thomas et al. |
| 5,488,664 A | 1/1996 | Shamir |
| 5,499,294 A | 3/1996 | Friedman |
| 5,509,074 A | 4/1996 | Choudhury |
| 5,515,081 A | 5/1996 | Vasilik |
| 5,521,372 A | 5/1996 | Hecht et al. |
| 5,524,936 A | 6/1996 | Kunt et al. |
| 5,526,427 A | 6/1996 | Thomas et al. |
| 5,530,751 A | 6/1996 | Morris |
| 5,530,759 A | 6/1996 | Braudaway et al. |
| 5,530,852 A | 6/1996 | Meske, Jr. et al. |
| 5,532,920 A | 7/1996 | Hartrick et al. |
| 5,537,216 A | 7/1996 | Yamashita et al. |
| 5,537,223 A | 7/1996 | Curry |
| 5,539,471 A | 7/1996 | Myhrvold et al. |
| 5,539,735 A | 7/1996 | Moskowitz |
| 5,541,662 A | 7/1996 | Adams et al. |
| 5,541,741 A | 7/1996 | Suzuki |
| 5,544,255 A | 8/1996 | Smithies et al. |
| 5,548,646 A | 8/1996 | Aziz et al. |
| 5,557,333 A | 9/1996 | Jungo et al. |
| 5,559,559 A | 9/1996 | Jungo et al. |
| 5,568,179 A | 10/1996 | Diehl et al. |
| 5,568,268 A | 10/1996 | Tsuji et al. |
| 5,568,570 A | 10/1996 | Rabbani |
| 5,572,010 A | 11/1996 | Petrie |
| 5,572,247 A | 11/1996 | Montgomery |
| 5,574,787 A | 11/1996 | Ryan |
| 5,576,532 A | 11/1996 | Hecht |
| 5,579,124 A | 11/1996 | Aijala et al. |
| 5,581,800 A | 12/1996 | Fardeau et al. |
| 5,582,103 A | 12/1996 | Tanaka et al. |
| 5,587,743 A | 12/1996 | Montgomery |
| 5,590,197 A | 12/1996 | Chen et al. |
| 5,602,920 A | 2/1997 | Bestler et al. |
| 5,606,609 A | 2/1997 | Houser et al. |
| 5,611,575 A | 3/1997 | Petrie |
| 5,612,943 A | 3/1997 | Moses et al. |
| 5,613,004 A | 3/1997 | Cooperman et al. |
| 5,613,012 A | 3/1997 | Hoffman et al. |
| 5,614,940 A | 3/1997 | Cobbley et al. |
| 5,617,148 A | 4/1997 | Montgomery |
| 5,627,655 A | 5/1997 | Okamoto et al. |
| 5,629,770 A | 5/1997 | Brassil |
| 5,629,980 A | 5/1997 | Stefik et al. |
| 5,636,292 A | 6/1997 | Rhoads |
| 5,638,443 A | 6/1997 | Stefik et al. |
| 5,638,446 A | 6/1997 | Rubin |
| 5,642,167 A * | 6/1997 | Wallace et al. ............ 348/420 |
| 5,646,997 A * | 7/1997 | Barton ..................... 380/23 |
| 5,647,017 A | 7/1997 | Smithies et al. |
| 5,649,054 A | 7/1997 | Oomen et al. |
| 5,652,626 A | 7/1997 | Kawakami et al. |
| 5,659,613 A | 8/1997 | Copeland et al. |
| 5,659,726 A | 8/1997 | Sandford, II et al. |
| 5,659,732 A | 8/1997 | Kirsch |
| 5,661,574 A | 8/1997 | Kawana |
| 5,663,766 A | 9/1997 | Sizer, II |
| 5,664,018 A | 9/1997 | Leighton |
| 5,666,487 A | 9/1997 | Goodman et al. |
| 5,671,277 A | 9/1997 | Ikenoue et al. |
| 5,680,223 A | 10/1997 | Cooper et al. |
| 5,687,191 A | 11/1997 | Lee et al. |
| 5,689,587 A | 11/1997 | Bender et al. |
| 5,689,623 A | 11/1997 | Pinard |
| 5,709,932 A | 1/1998 | Glez et al. |
| 5,710,834 A | 1/1998 | Rhoads |
| 5,712,920 A | 1/1998 | Spille |
| 5,719,937 A | 2/1998 | Warren et al. |
| 5,719,984 A | 2/1998 | Yamagata et al. |
| 5,721,788 A * | 2/1998 | Powell et al. ............... 382/100 |
| 5,727,092 A | 3/1998 | Sandford, II et al. |
| 5,737,025 A | 4/1998 | Dougherty et al. |
| 5,737,026 A | 4/1998 | Lu et al. |
| 5,739,864 A | 4/1998 | Copeland |
| 5,745,569 A | 4/1998 | Moskowitz et al. |
| 5,745,604 A | 4/1998 | Rhoads |
| 5,748,763 A | 5/1998 | Rhoads |
| 5,748,783 A | 5/1998 | Rhoads |
| 5,761,686 A | 6/1998 | Bloomberg |
| 5,764,763 A | 6/1998 | Jensen et al. |
| 5,764,770 A | 6/1998 | Schipper et al. |
| 5,765,152 A | 6/1998 | Erickson |
| 5,768,426 A | 6/1998 | Rhoads |
| 5,774,452 A | 6/1998 | Wolosewicz |
| 5,778,102 A | 7/1998 | Sandford, II et al. |
| 5,781,629 A | 7/1998 | Haber et al. |
| 5,784,461 A | 7/1998 | Shaffer et al. |
| 5,796,785 A | 8/1998 | Spiero |
| 5,799,081 A | 8/1998 | Kim et al. |
| 5,799,082 A | 8/1998 | Murphy et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,826,227 A | 10/1998 | Jayant |
| 5,826,892 A | 10/1998 | Braudaway et al. |
| 5,828,325 A | 10/1998 | Wolosewicz et al. |

| | | | |
|---|---|---|---|
| 5,832,119 | A | 11/1998 | Rhoads |
| 5,835,639 | A | 11/1998 | Honsinger et al. |
| 5,845,281 | A | 12/1998 | Benson |
| 5,850,249 | A | 12/1998 | Massetti et al. |
| 5,850,481 | A | 12/1998 | Rhoads |
| 5,857,038 | A | 1/1999 | Owada et al. |
| 5,859,920 | A | 1/1999 | Daly et al. |
| 5,862,218 | A | 1/1999 | Steinberg |
| 5,862,260 | A | 1/1999 | Rhoads |
| 5,878,010 | A | 3/1999 | Okamoto et al. |
| 5,889,868 | A | 3/1999 | Moskowitz et al. |
| 5,892,900 | A | 4/1999 | Ginter et al. |
| 5,893,067 | A | 4/1999 | Bender et al. |
| 5,905,505 | A | 5/1999 | Lesk |
| 5,905,819 | A | 5/1999 | Daly |
| 5,907,443 | A | 5/1999 | Hirata |
| 5,929,920 | A | 7/1999 | Sizer, II |
| 5,930,369 | A | 7/1999 | Cox et al. |
| 5,937,000 | A | 8/1999 | Lee et al. |
| 5,949,055 | A | 9/1999 | Fleet et al. |
| 5,960,151 | A | 9/1999 | Takahashi |
| 5,970,140 | A | 10/1999 | Sandford, II et al. |
| 5,987,459 | A | 11/1999 | Swanson et al. |
| 5,991,500 | A | 11/1999 | Kanota et al. |
| 6,000,621 | A | 12/1999 | Hecht et al. |
| 6,086,706 | A | 7/2000 | Brassil et al. |
| 6,091,844 | A * | 7/2000 | Fujii et al. ................... 382/135 |
| 6,185,312 | B1 * | 2/2001 | Nakumura et al. ......... 382/100 |

FOREIGN PATENT DOCUMENTS

| | | |
|---|---|---|
| EP | 493 091 | 12/1990 |
| EP | 411 232 | 2/1991 |
| EP | 418 964 | 3/1991 |
| EP | 441 702 | 8/1991 |
| EP | 551 016 A1 | 2/1994 |
| EP | 581 317 | 2/1994 |
| EP | 605 208 A2 | 7/1994 |
| EP | 629 972 | 12/1994 |
| EP | 642 060 | 3/1995 |
| EP | 649 074 A1 | 4/1995 |
| EP | 650 146 A1 | 4/1995 |
| EP | 651 554 | 5/1995 |
| EP | 705 025 A2 | 4/1996 |
| EP | 905 967 A1 | 3/1999 |
| GB | 2063018 | 5/1981 |
| GB | 2067871 | 7/1981 |
| GB | 2196167 | 4/1988 |
| GB | 2204984 | 11/1988 |
| JP | 4-248771 | 9/1992 |
| JP | 05/242217 | 9/1993 |
| JP | 8-30759 | 2/1996 |
| WO | WO89/08915 | 9/1989 |
| WO | WO93/25038 | 12/1993 |
| WO | WO95/10835 | 4/1995 |
| WO | WO95/14289 | 5/1995 |
| WO | WO95/20291 | 7/1995 |
| WO | WO96/26494 | 8/1996 |
| WO | WO96/27259 | 9/1996 |
| WO | WO97/31440 | 8/1997 |
| WO | WO97/46012 | 12/1997 |
| WO | WO99/17536 | 4/1999 |

OTHER PUBLICATIONS

Bors et al., "Image Watermarking Using DCT Domain Constraints", IEEE 1996, pp. 231–234.*

Tsatsanis et al., "Object Detection and Classification Using Matched Filtering and High–Order Statistics", Multidimensional Signal Processing Workshop, 1989, Sixth, pp. 32–33.*

Arnold et al., "Arithmetic Co–Transformations in the Real and Complex Logarithmic Number Systems", IEEE 1997, pp. 190–199.*

Tistarelli et al., "Direct Estimation of Tme–to–Impact From Optical Flow", Proceedings of the IEEE Workshop, 1991, pp. 226–233.*

Tistarelli et al., "On the Advantages of Polar and Log–Polar Mapping for Direct Estimation of Time–to–Impact From Optical Flow", Pattern analysis and Machine Intelligence, IEEE Trans. on, vol. 15, Apr. 1993.*

Bonmassar et al., "Lie groups, Space–Variant Fouurier Analysis and the Exponential Chirp Transform", 1996 IEEE, pp 492–498.*

Thornton et al., "Log–Polar Incorporating a Novel Spatially Variant Filter to Improve Object Recognition", IPA97, Jul. 15–17, 1997, Conference Publication No. 443 @IEE, pp 776–779.*

Sugahara et al., "Complex–Log Mapping Approach to Rotation and Enlargement or Reducttion of Digital Images and its Performance Evaluation", 1996 IEEE pp. 1655–1660.*

Brassil et al., Electronic Marking and Identification Techniques to Discourage Document Copying, *Proceedings of INFOCOM '94 Conference on Computer, IEEE Commun. Soc Conference*, Jun. 12–16, 1994, pp. 1278–1287.

Jain, "Image Coding Via a Nearest Neighbors Image Model," *IEEE Transactions on Communications*, vol. COM–23, No. 3, Mar. 1975, pp. 318–331.

Arthur, "Digital Fingerprints Protect Artwork," *New Scientist*, Nov. 12, 1994, p. 24.

Matthews, "When Seeing is Not Believing," *New Scientist*, Oct. 16, 1993, pp. 13–15.

Bender et al., "Techniques for Data Hiding," Massachusetts Institute of Technology, Media Laboratory, Jan. 1995, 10 pages.

Walton, "Image Authentication for a Slippery New Age," *Dr. Dobb's Journal*, Apr. 1995, pp. 18–26, 82–87.

Port, "Halting Highway Robbery on the Internet," *Business Week*, Oct. 17, 1994, p. 212.

"Foiling Card Forgers With Magnetic 'Noise,'" *Wall Street Journal*, Feb. 8, 1994.

Fitzgerald, "Invisible Digital Copyright ID," *Editor & Publisher*, Jun. 25, 1994, p. 62.

van Schyndel et al., "A Digital Watermark," *IEEE International Conference on Image Processing*, Nov. 13–16, 1994, pp. 86–90.

Matsui et al., "Video–Steganography: How to Secretly Embed a Signature in a Picture," *IMA Intellectual Property Project Proceedings*, Jan. 1994, vol. 1, Issue 1, pp. 187–205.

Tanaka et al., "Embedding Secret Information Into a Dithered Multi–Level Image," *Proc. IEEE Military Comm. Conf.*, Sep. 1990, pp. 216–220.

Tanaka et al., "New Integrated Coding Schemes for Computer–Aided Facsimile," *Proc. IEEE Int'l Conf. on Sys. Integration*, Apr. 1990, pp. 275–281.

Schreiber et al., "A Compatible High–Definition Television System Using the Noise–Margin Method of Hiding Enhancement Information," *SMPTE Journal*, Dec. 1989, pp. 873–879.

Short, "Steps Toward Unmasking Secure Communications," *International Journal of Bifurcation and Chaos*, vol. 4, No. 4, 1994, pp. 959–977.

Tanaka, "Embedding the Attribute Information Into a Dithered Image," *Systems and Computers in Japan*, vol. 21, No. 7, 1990, pp. 43–50.

Nakamura et al., "A Unified Coding Method of Dithered Image and Text Data Using Micropatterns," *Electronics and Communications in Japan*, Part 1, vol. 72, No. 4, 1989, pp. 50–56.

Simmons, "Subliminal Channels; Past and Present," *ETT*, vol. 5, No. 4, Jul.–Aug. 1994, pp. 45–59.

Nakamura et al., "A Unified Coding Method of Image and Text Data Using Discrete Orthogonal Transform," *Systems and Computers in Japan*, vol. 21, No. 3, 1990, pp. 87–92.

Tanaka et al., "A Visual Retrieval System with Private Information for Image Database," *Proceeding International Conference on DSP Applications and Technology*, Oct. 1991, 00. 415–421.

Sapwater et al., "Electronic Copyright Protection," *PHOTO>Electronic Imaging*, vol. 37, No. 6, 1994, pp. 16–21.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

Boneh, "Collusion–Secure Fingerprinting for Digital Data," Department of Computer Science, Princeton University, 1995, 31 pages.

Burgett et al., "A Novel Method for Copyright Labeling Digitized Image Data," requested by e–mail from author (unavailable/password protected on IGD WWW site); received Sep. 18, 1995, 12 pages.

Friedman, "The Trustworthy Digital Camera: Restoring Credibility to the Photographic Image," IEEE Transactions on Consumer Electronics, vol. 39, No. 4, Nov., 1993, pp. 905–910.

"Cyphertech Systems: Introduces Digital Encoding Device to Prevent TV Piracy," *Hollywood Reporter*, Oct. 20, 1993, p. 23.

"NAB—Cyphertech Starts Anti–Piracy Broadcast Tests," *Newsbytes*, NEW03230023, Mar. 23, 1994.

Humphrey, "Stamping Out Crime," *Hollywood Reporter*, Jan. 26, 1994, p. S48.

Koch et al., "Towards Robust and Hidden Image Copyright Labeling," *Proc. of 20995 IEEE Workshop on Nonlinear Signal and Image Processing*, Jun. 20–22, 1995, 4 pages.

"Copyright Protection for Digital Images, Digital Fingerprinting from FBI," Highwater FBI brochure, 1995, 4 pages.

"High Water FBI Limited Presentation Image Copyright Protection Software," FBI Ltd brochure, Jul., 1995, 17 pages.

"Steganography," *Intellectual Property and the National Information Infrastructure The Report of the Working Group on Intellectual Property Rights*, Sep. 1995, pp. 212–213.

Caruso, "Digital Commerce, 2 plans for watermarks, which can bind proof of authorship to electronic works." *New York Times*, Aug. 7, 1995, one page.

"Holographic signatures for digital images," *The Seybold Report on Desktop Publishing*, Aug. 1995, one page.

Clarke, "Invisible Code Tags Electronic Images," *Electronic Engineering Times*, Jun. 12, 1995, n. 852, p. 42.

"The Copyright Can of Worms Opened Up By The New Electronic Media," *Computergram Internations*, pCGN0717006, Jul. 17, 1995 and "The Copyright Can of Worms Opened Up By the New Electronic Media—2," *Computergram Internations*, pCGN07210008, Jul. 21, 1995, 3 pages total.

"Access Control and COpyright Protection for Images, WorkPackage 1: Access Control and Copyright Protection Images Need Evaluation," Jun., 1995, 21 pages.

"Access Control and COpyright Protection for Images, Conditional Access and Copyright Protection Based on the Use of Trusted Third Parties," 1995, 43 pages.

Luc, "Analysis of Spread Spectrum System Parameters for Design of Hidden Transmission," *Radioengineering*, vol. 4, No. 2, Jun. 1995, pp. 26–29.

Macq, "Cryptology for Digital TV Broadcasting," *Proceedings of the IEEE*, vol. 83, No. 6, Jun. 1995, pp. 944–957.

Zhao et al., "Embedding Robust Labels Into Images for Copyright Protection," *Proc. of the International Congress on Intellectual Property Rights for Specialized Information, Knowledge and New Technologies* (Vienna, Austria) Aug. 21–25, 1995, 10 pages.

Frequently Asked Questions About Digimarc Signature Technology, Aug. 1, 1995, HTTP://WWW.DIGIMARC.COM, 9 pages.

Bender et al, "Techniques for Data Hiding," Draft Preprint, Private Correspondence, dated Oct. 30, 1995.

Johhnson, "Steganography," Dec. 10, 1995, 32 pages.

Aura, "Invisible Communication," Helskinki University of Technology, Digital Systems Laboratory, Nov. 5, 1995, 13 pages.

Digimarc presentation at RSA Conference, approximately Jan. 17, 1996, 4 pages.

Hecht, "Embedded Data Glyph Technology for Hardcopy Digital Documents," SPIE vol. 2171, 2/94, pp. 341–352.

Roberts, "Picture Coding Using Pseudorandom Noise," IRE Trans. on Information Theory, vol. 8, No. 2, Feb., 1962, pp. 145–154.

Choudhury, et al., "Copyright Protection for Electronic Publishing over Computer Newtorks," *IEEE Network Magazine*, Jun. 1994, 18 pages.

Möller, et al., "Rechnergestultzte Steganographie: Wie sie Funktioniert und warum folglich jede Reglementierung von Verschlusselung unsinnig ist," *DuD, Datenschutz und Diatensicherung*, 18/6 (1994) 318–326.

Pennebaker et al., *JPEG Still Image Data Compression Standard*, Chapter 3, "Aspects of the Human Visual System," pp. 23–27, 1993, Van Nostrand Reinhold, New York.

Castro et al., "Registration of Translated and Rotated Images Using Finite Fourier Transforms," *IEEE Transactions on Pattern Analysis and Machine Intelligence*, vol. PAMI–9, No. 5, Sep. 1987, pp. 700–703.

Weber et al., "Correlative Image Registration," *Seminars in Nuclear Medicine*, vol. XXIV, No. 4 (Oct.), 1994, pp. 311–323.

Toga et al., "Registration Revisited," *Journal of Neuroscience Methods*, 48 (1993), pp. 1–13.

Sheng et al., "Experiments on Pattern Recognition Using Invariant Fourier–Mellin Descriptors," *Journal of Optical Society of America*, vol. 3, No. 6, Jun., 1986, pp. 771–776.

Bartlett, et al., "An Overview of HighWater FBI Technology," Posted on Internet Mar. 22, 1996, 12 pages.

Kurak et al., "A Cautionary Note On Image Downgrading," 1992 IEEE, pp. 153–159.

Wagner, "Fingerprinting," 1983 IEEE, pp. 18–22.

Sandford II, et al., "The Data Embedding Method," SPIE vol. 2615, Oct. 23, 1995, pp. 226–259.

Brassil et al., "Hiding Information in Document Images," Nov., 1995, 7 pages.

Pitas et al., "Applying Signatures on Digital Images," IEEE Workshop on Nonlinear Image and Signal Processing, Neos Marmaras, Greece, pp. 460–463, Jun., 1995.

Bors et al., "Embedding Parametric Digital Signatures in Images," EUSIPCO–96, Trieste, Italy, accepted for publication, Sep. 1996 (Published on internet Apr. 9, 1996, (http://poseidon.csd.auth.gr/papers/confers.1_ind.html)), 4 pages.

Nikolaidis et al., "Copyright Protection of Images Using Robust Digital Signatures," IEEE International Conference on Acoustics, Speech and Signal Processing (ICASSP–96), accepted for publication, May 1996 (Published on internet Apr. 9, 1996, (http://poseidon.csd.auth.gr/papers/confers.1_ind.html)), 4 pages. (Also published 1996 IEEE International Conference on Acoustics, Speech, and Signal Processing Conference Proceedings, May 7–10, 1996, vol. 4, pp. 2168–2171.).

Pitas, "A Method for Signature Casting on Digital Images," 1996 IEEE International Conference on Image Processing (ICIP'96), Lausanne, Switzerland, accepted for publication, Sep. 16–19, 1996 (Published on internet Apr. 9, 1996, (http://poseidon.csd.auth.gr/papers/confers.1_ind.html)), 4 pages.

Voyatzis, et al., Chaotic Mixing of Digital Images and Applications to Watermarking, European Conference on Multimedia Applications, Services and Techniques (ECMAST'96), Louvain–la–Neuve, Belgium, accepted for publication, May 1996 (Published on internet Apr. 9, 1996, (http://poseidon.csd.auth.gr/papers/confers.1_ind.html)), 8 pages.

Koch et al., "Digital Copyright Labeling: Providing Evidence of Misuse and Tracking Unauthorized Distribution of Copyrighted Materials," OASIS Magazine, Dec. 1995, 3 pages.

Rindfrey, "Towards an Equitable System for Access Control and Copyright Protection in Broadcast Image Services: The Equicrypt Approach," *Intellectual Property Rights and New Technologies*, Proc. of the Conference, R. Oldenbourg Verlag Wien München 1995, 12 pages.

Boney et al., "Digital Watermarks for Audio Signals," Proceedings of MULTIMEDIA '96, 1996 IEEE, pp. 473–480.

Boucqueau et al., Equitable Conditional Access and Copyright Protection for Image Based on Trusted Third Parties, *Teleservices & Multimedia Communications, 2nd Int. Cost 237 Workshop*, Second International COST 237 Workshop, Nov., 1995; published 1996, pp. 229–243.

Delaigle et al., "Digital Watermarking," Proc. SPIE—Int. Soc. Opt. Eng., vol. 2659, pp. 99–110, 1996.

Dautzenberg, "Watermarking Images," Department of Microelectronics and Electrical Engineering, Trinity College Dublin, 47 pages, Oct. 1994.

van Schyndel et al., "Towards a Robust Digital Watermark," ACCV '95, vol. 2, Dec., 1995, pp. 504–508.

Lesk, "Digital Libraries Meet Electronic Commerce: On–Screen Intellectual Property," Proceedings of the Third Forum on Research and Technology Advances in Digital Libraries—ADL—'96—(Cat. No. 96TB100053), 1996, pp. 58–64.

Chudy, "Handcuff Digital Thieves," Byte Magazine, Apr., 1996, 4 pages.

New Product Information, "FBI at AppleExpo" (Olympia, London), Nov., 1995, 2 pages.

DICE Digital Watermark System, Q&A, Dec., 1995, 12 pages.

Ohnishi et al., Embedding a Seal into a Picture Under Orthogonal Wavelet Transform, Proceedings of MULTIMEDIA '96, 1996, IEEE, pp. 514–521.

Arazi, et al., "Intuition, Perception, and Secure Communication," IEEE Transactionson Systems, Man, and Cybernetics, vol. 19, No. 5, Sep./Oct. 1989, pp. 1016–1020.

Bruyndonckx et al., "Spatial Method for Copyright Labeling of Digital Images," 1994, 6 pages.

Craver et al., "Can Invisible Watermarks Resolve Rightful Ownerships?" IBM Technical Report RC 20509, Jul. 25, 1996, pp 1–21. (also published Proc. SPIE—Int. Soc. Opt. Eng. vol. 3022, pp. 310–321, conf. Feb. 13–14, 1997).

"Watermarking & Digital Signature: Protect Your Work!" Published on Internet 1996, http://ltswww.epfl.ch/ jordan/watermarking.html.

Gabor, et al., "Theory of Communication," J. Inst. Elect. Eng. 93, 1946, pp. 429–441.

Bruyndonckx et al., Neural Network Post–Processing of Coded Images Using Perceptual Masking, 1994, 3 pages.

Pickholtz et al., "Theory of Spread–Spectrum Communications—A Tutorial," Transactions on Communications, vol. COM–30, No. 5, May, 1982, pp. 855–884.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

Tirkel et al., A Two–Dimensional Digital Watermark, Conf. Proc. DICTA–95. 10 pages.

Delaigle et al., "A Psychovisual Approach for Digital Picture Watermarking," 1995, 20 pages.

Fimmerstad, "The Virtual Art Museum," Ericsson Connexion, Dec., 1995, pp. 29–31.

Brandt et al., "Representations that Uniquely Characterize Images Modulo Translation, Rotation, and Scaling," Pattern Recognition Letters, Aug. 1, 1996, pp. 1001–1015.

Mintzer et al., "Toward on–line, Worldwide Access to Vatican Library Materials," IBM J. Res. Develop. vol. 40 No. 2, Mar., 1996, pp. 139–162.

Hartung et al., Digital Watermarking of Raw and Compressed Video, Proc. SPIE 2952, Digital Compression Technologies and Systems for Video Communications, Oct., 1996, pp 205–213.

Cox et al., "A Secure, Imperceptable Yet Perceptually Salient, Spread Spectrum Watermark for Multimedia,"IEEE, Southcon/96, Conference Record, pp. 192–197, 1996.

Caronni, "Assuring Ownership Rights for Digital Images," Published in the Proceedings of 'Reliable IT Systems,' VIS '95, HH. Brüggemann and W. Gerhardt–Häckl (Ed.), Vieweg Publishing Company, Germany, 1995, Jun. 14, 1994, 10 pages.

Tirkel et al, "Electronic Water Mark," DICTA–93, Macquarie University, Sydney, Australia, Dec., 1993, pp. 666–673.

Koch et al., "Copyright Protection for Multimedia Data," Proc. of the International Conference on Digital Media and Electronic Publishing, Dec. 6–8, 1994, Leeds, U.K., 15 pages.

Cox et al., "Secure Spread Spectrum Watermarking for Multimedia," NEC Research Institute Technical Report, Dec. 5, 1995, 33 pages.

Voyatzis et al., "Applications of Total Automorphisms in Image Watermarking," 1996 IEEE International Conference on Image Processing (ICIP'96), Lausanne, Switzerland, Part vol. 2, pp. 237–240, Sep. 16–19, 1996 (Published on internet Apr. 9, 1996, (http://poseidon.csd.auth.gr/papers/confers.1_ind.html)), 4 pages, 1996 IEEE, Sep. 16–19, 1996, Lausanne, Switzerland, pp. 237–239.

Szepanski, "A Signal Theoretic Method for Creating Forgery–Proof Documents for Automatic Verification," Proceedings 1979 Carnahan Conference on Crime Countermeasures, May 16, 1979, pp. 101–109 (Cited OA of Mar. 26, 1979).

Cheong, "Internet Agent, Spiders, Wanderers, Brokers, and Bots," New Riders Publishing, Indianapolis, IN, 1996, 413 pages.

Schneier, "Digital Signatures, Cryptographic Algorithms Can Create Nonforgeable Signatures for Electronic Documents, Making Them Valid Legal Instruments," Byte, Nov. 1993, pp. 309–312.

Wise, "The History of Copyright, Photographers' Rights Span Three Centuries" Photo>Electronic Imaging, vol. 37, No. 6, 1994.

"Access Control and Copyright Protection of Images, Conditional Access and Copyright Protection Based on the Use of Trusted Third Parties," 1995, 43 pages.

Choudhury, et al., "Copyright Protection for Electronic Publishing over Computer Networks," IEEE Network Magazine, Jun. 1994, 18 pages.

Roberts, "Picture Coding Using Pseudorandom Noise," IRE Trans. on Information Theory, vol. 8, No. 2, Feb., 1962, pp. 145–154.

Kassam, Signal Detection in Non–Gaussian Noise, Dowden & Culver, 1988, pp. 1–96.

Komatsu et al., "Authentication System Using Concealed Image in Telematics," Memoirs of the School of Science & Engineering, Waseda Univ., No. 52, 1988, pp. 45–60.

Komatsu et al., "A Proposal on Digital Watermark in Document Image Communication and Its Application to Realizing a Signature," Electronics and Communications in Japan, Part 1, vol. 73, No. 5, 1990, pp. 22–33.

Machado, "Announcing Stego 1.0a2, The First Steganography Tool for the Macintosh," Internet reference, Nov. 28, 1993, 3 pages.

Möller, et al., "Rechnergestutzte Steganographie: Wie sie Funktioniert und warum folglich jede Reglementierung von Verschlusselung unsinnig ist," (with English abstract), Datenschutz und Datensicherung, 18/6 (1994) 318–326.

Hecht, "Embedded Data Glyph Technology for Hardcopy Digital Documents," SPIE vol. 2171, 2/94, pp. 341–352.

Brown, "S–Tools for Windows, Version 1.00; What is Steganography," Internet reference, Mar. 6, 1994, 6 pages.

shaggy@phantom.com, "Hide and Seek v. 4.0," Internet reference, Apr. 10, 1994, 3 pages.

Arachelian, "White Noise Storm," Apr. 11, 1994, Internet reference, 13 pages.

"Access Control and Copyright Protection for Images, WorkPackage 1: Access Control and Copyright Protection for Images Need Evaluation," Jun., 1995, 21 pages.

Luc, "Analysis of Spread Spectrum System Parameters for Design of Hidden Transmission," Radioengineering, vol. 4, No. 2, Jun. 1995, pp. 26–29.

Macq, "Cryptology for Digital TV Broadcasting," Proceedings of the IEEE, vol. 83, No. 6, Jun. 1995, pp. 944–957.

Frequently Asked Questions About Digimarc Signature Technology, Aug. 1, 1995, 9 pages.

Zhao et al., "Embedding Robust Labels Into Images for Copyright Protection," Proc. of the International Congress on Intellectual Property Rights for Specialized Information, Knowledge and New Technologies (Vienna, Austria), Aug. 21–25, 1995, 10 pages.

Bender et al, "Techniques for Data Hiding," Draft Preprint, Private Correspondence, dated Oct. 30, 1995, 45 pages.

Aura, "Invisible Communication," Helskinki University of Technology, Digital Systems Laboratory, Nov. 5, 1995, 13 pages.

Johhnson, "Steganography," Dec. 10, 1995, 32 pages.

Digimarc presentation at RSA Conference, Jan., 1996, 4 pages.

Szepanski, "Compatibility Problems in Add–On Data Transmission for TV–Channels," 2d Symp. and Tech. Exh. On Electromagnetic Compatibility, Jun. 28, 1977, pp. 263–268.

Szepanski, "Optimization of Add–On Signals by Means of a Modified Training Algorithm for Linear Classifiers," IEEE Int'l Symp. On Info. Theory, Oct. 10, 1977, pp. 27–28.

Szepanski, "Binary Data Transmission Over Video Channels with Very Low Amplitude Data Signals," Fernseh– und Kino–Technik, vol. 32, No. 7, Jul., 1978, pp. 251–256. (German text with full English translation.).

Szepanski, Additive Binary Data Transmission for Video Signals, Conference of the Communications Engineering Society, 1980, NTG Technical Reports, vol. 74, pp. 343–351. (German text with full English translation).

Franz et al., "Computer Based Steganography: How It Works and Why Therefore Any Restrictions on Cryptography are Nonsense, at Best," Information Hiding, First Int. Workshop Proc, May 30–Jun. 1, 1996, pp. 7–21, (a counterpart was published in German by Steffen Moller et al in 1994).

Proudler, Graeme J., "Authentication and Display of Signatures on Electronic Documents," 2244 Research Disclosure, Feb., 1994, No. 358, Emsworth, GB, 1 page.

Oomen, A. et al, "A Variable–Bit Rate Buried–Data Channel for Compact Disc," Journal of the Audio Engineering Society vol. 43, No. 1–2, pp. 23–28, Jan.—Feb., 1995.

Bender, Techniques for Data Hiding, Proc. SPIE, Vo. 2420, Feb. 9, 1995, pp. 164–173.

Bender et al., "Techniques for Data Hiding," Massachusetts Institute of Technology, Media Laboratory, Draft Preprint, Apr. 13, 1995, 10 pages.

Matsui et al., "Video–Steganography: How to Secretly Embed a Signature in a Picture," IMA Intellectual Property Project Proceedings, Jan. 1994, vol. 1, Issue 1, pp. 187–205.

JPEG Group's JPEG Software (release 4), FTP.CSU-A.BEREKELEY.EDU /PUB/CYPHERPUNKS/APPLICATIONS/ JSTEG,JPEG.ANNOUNCEMENT.GZ, Jun. 7, 1993, 2 pages.

Caronni, "Assuring Ownership Rights for Digital Images," Published in the Proceedings of 'Reliable IT Systems,' VIS '95, HH. Brüggemann and W. Gerhardt–Häckl (Ed.), Vieweg Publishing Company, Germany, 1995, Jun. 14, 1994, 10 pages. (Originally published as an ETH (Zurich) Technical Report, "Ermitteln Unauthorisierter Verteiler von Maschinenlesbaren Daten," 8/93.

Quisquater, J., "Access Control and COpyright Protection for Images, Conditional Access and Copyright Protection Based on the Use of Trusted Third Parties," 1995, 43 pages.

Gerzon, M.A., et al, "A High–Rate Buried–Data Channel for Audio CD," Journal of the Audio Engineering Society, vol. 43, No. 1–2, p. 3–22, Jan.—Feb., 1995.

Aura, "Practical Invisibility in Digital Communication," Information Hiding, First Int. Workshop Proc. May 30–Jun. 1, 1996, pp. 265–278.

Anderson, "Stretching the Limits of Steganography," Information Hiding, First International Workshop Proc., May 30–Jun. 1, 1996, pp. 39–48.

Stone, Analysis of Attacks on Image Watermarks with Randomized Coefficients, May 17 1996, pp. 1–27.

Zhao, "A WWW Service to Embed and Prove Copyright Watermarks," In Proc. of the European Conf. on Multimedia Applications, Services and Techniques, Louvain–La–Neuve, Belgium, May 1996, 14 pages.

Braudaway et al., "Protecting Publicly–Available Images with a Visible Image Watermark," SPIE vol. 2659, Feb. 1, 1996, pp. 126–133.

Tirkel et al., A Two–Dimensional Digital Watermark, Conf. Proc. DICTA–95, Dec. 6–8, 1995. 10 pages.

Cha et al., "A Solution to the On–Line Image Downgrading Problem," Proc. 11$^{th}$ Annual Computer Security Applications Conf., Dec. 11, 1995, pp. 108–112.

Tirkel, et al "Image Watermarking–A Spread Spectrum Application" Proc. IEEE, ISSSTA'96, Mainz, Germany, Sep. 22–25, 1996, vol. II, p. 785–789.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

Horak, "From 'Steganographia' to Subliminal Communication," "Communications and Multimedia Security," Sep., 1995, pp. 205–213.

Oruanaidh et al., "Rotation, Scale and Translation Invariant Digital Image Watermarking," Aug. 1997, 4 pages.

Pereira et al., "Template Based Recovery of Fourier–Based Watermarks Using Log–Polar and Log–Log Maps," IEEE Int. Conf on Multimedia Computing and Systems (ICMCS'99) Florence, Italy, Jun. 1999.

Oruanaidh et al., Rotation, Scale and Translation Invariant Digital Image Watermarking, 1997 IEEE 536–639.

\* cited by examiner

DETERMINING TRANSFORMATIONS OF MEDIA SIGNALS WITH EMBEDDED CODE SIGNALS

RELATED APPLICATION DATA

This application is a continuation-in-part of application Ser. No. 09/452,023, filed Nov. 30, 1999. This application is also a continuation-in-part of application Ser. No. 08/746,613, filed Nov. 12, 1996, (now U.S. Pat. No. 6,122,403). This application is also a continuation-in-part of application Ser. No. 09/186,962, filed Nov. 5, 1998, which is a continuation of application Ser. No. 08/649,419, filed May 16, 1996(now U.S. Pat. No. 5,862,260).

The subject matter of the present application is also related to that of the assignee's other patents and applications, including U.S. Pat. Nos. 5,930,377, 5,809,160, 5,721,788, 5,745,604, 5,768,426, 5,850,481, 5,748,753, 5,710,834, 5,636,292, 5,841,978, 5,841,886, 5,832,119, 5,822,436, 5,862,260, and pending applications Ser. Nos. 08/951,858, 08/967,693, 09/074,034, 09/127,502, 09/151,492, 09/185,380, 09/292,569, 09/314,648, 09/337,590, 09/343,104, 09/342,688, 09/343,101, 09/342,971, 09/342,689, 09/408,026, 09/433,104, 60/163,332, 09/434,757, 09/437,357, 60/164,619, 09/452,021, 09/452,022, 60/112,955, 60/134,782, 09/503,881 and 60/158,015. The technology disclosed in this application can advantageously be used in the methods and systems disclosed in the foregoing patents and applications (all of which are incorporated by reference).

TECHNICAL FIELD

The invention relates to multimedia processing, and more specifically relates to detecting embedded code signals in media such as images, video and audio.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark pattern by altering data samples of the media content in the spatial or frequency domains. The reading component analyzes target content to detect whether a watermark pattern is present. In applications where the watermark encodes information, the reader extracts this information from the detected watermark.

One challenge to the developers of watermark embedding and reading systems is to ensure that the watermark is detectable even if the watermarked media content is corrupted in some fashion. The watermark may be corrupted intentionally, so as to bypass its copy protection or anti-counterfeiting functions, or unintentionally through various transformations that result from routine manipulation of the content (e.g., digital to analog conversion, geometric distortion compression, etc.). In the case of watermarked images, such manipulation of the image may distort the watermark pattern embedded in the image. In general, the geometric distortion may result in some linear or non-linear geometric transformation. An affine transformation encompasses various linear transformations, including scale, translation, rotation, differential scale, and shear.

To accurately detect and read the watermark, it is helpful to determine the parameters of this affine transformation. The reader may then use these parameters to adjust the corrupted image to approximate its original state and then proceed to read the information content represented in the watermark.

Watermarks are often difficult to detect and read in corrupted media, particularly if the original un-marked media is not available to assist in the detection and reading process. Thus, there is a need to develop techniques for accurately detecting the presence and orientation of a watermark in corrupted media where the original media is not available.

In some applications, it is useful to determine whether a media signal, such as an audio, image or video signal has been transformed, and if so, how it has been transformed. Methods capable of determining alteration of a signal are useful in a variety of applications, including forensics and encoding auxiliary messages in media. In some applications, there is a need to be able to restore a media signal to its original state in addition to detecting alteration.

The invention provides a method and system of determining a transformation of a media signal subsequent to the encoding of an embedded code signal into the media signal. It also provides a method and system to determine the orientation of the embedded code signal in a media signal after the media signal has been transformed. The invention applies to various types of media signals, including image, video and audio signals.

One aspect of the invention is a method of determining a transformation of a media signal having an embedded code signal. The method performs a logarithmic sampling of the media signal to create a sampled signal in which scaling of the media signal is converted to translation in the sampled signal. It then computes the translation of the embedded code signal in the sampled signal to determine scaling of the media signal subsequent to the encoding of the embedded signal in the media signal.

The embedded code signal may be implemented in a variety of ways. In one implementation, the embedded code signal comprises a set of impulse functions in a frequency domain. In particular, the impulse functions may be in a Fourier domain, or some other transform domain such as wavelet, Discrete Cosine Transform, etc. For some applications, the impulse functions have random or pseudo-random phase. When the impulse functions have random phase, they tend to make the embedded code signal imperceptible or less perceptible. For instance, the embedded code signal may be an imperceptible or substantially imperceptible digital watermark in an image or audio signal.

Using the embedded code signal's phase attributes, a detection process can determine the position of the embedded code signal or the translation of the media signal in which it is embedded. For example, the detection process may be used to determine a shift, offset, or cropping of the media signal after it has been encoded with the embedded code signal. In particular, the detection process may perform phase matching between the code signal and a media signal suspected of containing an embedded code signal (a suspect signal). One form of phase matching is a matched filtering process between the code signal and the suspect media signal in the spatial or temporal domain. This process may be performed on one dimensional signals such as audio signals, or two or more dimensional signals like images and video.

The logarithmic sampling may be performed directly on the media signal or after it has been converted to a transform domain. For example, one implementation performs the sampling on frequency domain data of the media signal. Depending on the nature of the media signal and the application, the sampling may be performed in two or more dimensions. A two-dimensional signal, such as an image, may be logarithmically sampled in each of the two dimensions to determine scaling in each dimension. A three dimensional signal, such as a video sequence, may be logarithmically sampled in three dimensions. After sampling, matched filtering, or other forms of filtering, may be used to determine the translation of the embedded code signal in the sampled signal in each of the dimensions. The extent of translation in the sampled signal corresponds to scaling in the media signal.

Polar sampling may also be used to convert rotation of a media signal into translation in polar coordinates. Once converted in this manner, matched filtering may be used to determine translation of the embedded code signal in the sampled signal. The translation in polar coordinates provides the angle of rotation of the media signal subsequent to encoding of the embedded code signal.

Logarithmic sampling may also be performed in combination with a polar sampling. The logarithmic or polar sampling may be performed on the media signal directly (e.g., in its native spatial, or temporal domain) or on frequency domain or other transform domain data of the media signal. Similarly, the embedded code signal, or components of it, may be defined in the spatial or frequency domain, or in a transform domain. One example of an embedded code signal is a watermark signal with fixed attributes that can be located via matched filtering in the sampled media signal.

Further advantages and features of the invention will become apparent with reference to the following detailed description and accompanying drawings.

DETAILED DESCRIPTION

Introduction

A watermark provides a mechanism for imperceptibly embedding information into digital media content. Media content includes various forms of data represented as a collection of digital samples that may be altered without disrupting the function or appearance of the data in a perceptible way. Watermarking is particularly suited for visual and audio media such as images, video and sound, yet it applies to other data forms as well. It may be performed in the digital and analog domains.

The watermark is "imperceptible" from the standpoint that it makes minor alterations to media samples that are generally not noticeable to the user. The degree to which the watermark is imperceptible at playback depends on the implementation and the requirements of the application. In some applications, it may be sufficient that the watermark is virtually imperceptible even though one might discern it upon closer scrutiny. Also, some applications may utilize an imperceptible watermark along with perceptible markings to help detect the watermark or determine its orientation.

Digital watermarking systems are sometimes classified based on how they alter the underlying media content to embed information. Some systems directly alter data samples in the domain in which the media is presented as output while other systems transform the data into another domain and then alter the transformed samples. In watermarking of digital images for example, the system may alter discrete pixel values in the spatial domain, or it may transform the image into discrete spatial frequency components and alter the frequency components. In the image field alone, there are many different types of transforms to different domains, such as a discrete cosine transform (DCT), Fourier transform, Karhunen-Loeve transform (KLT), wavelet transform etc. The embedding component of a watermarking system may embed a watermark pattern in any of these domains and then convert the watermarked media back to its original form. Similarly, the embedding component may transform a watermark pattern from one domain to the output domain of the target media content (e.g., spatial domain for images) and combine the transformed pattern with the original media content to create a watermarked version of the target media.

Using Fourier Mellin Transform in Watermark Detection

Figure 1:
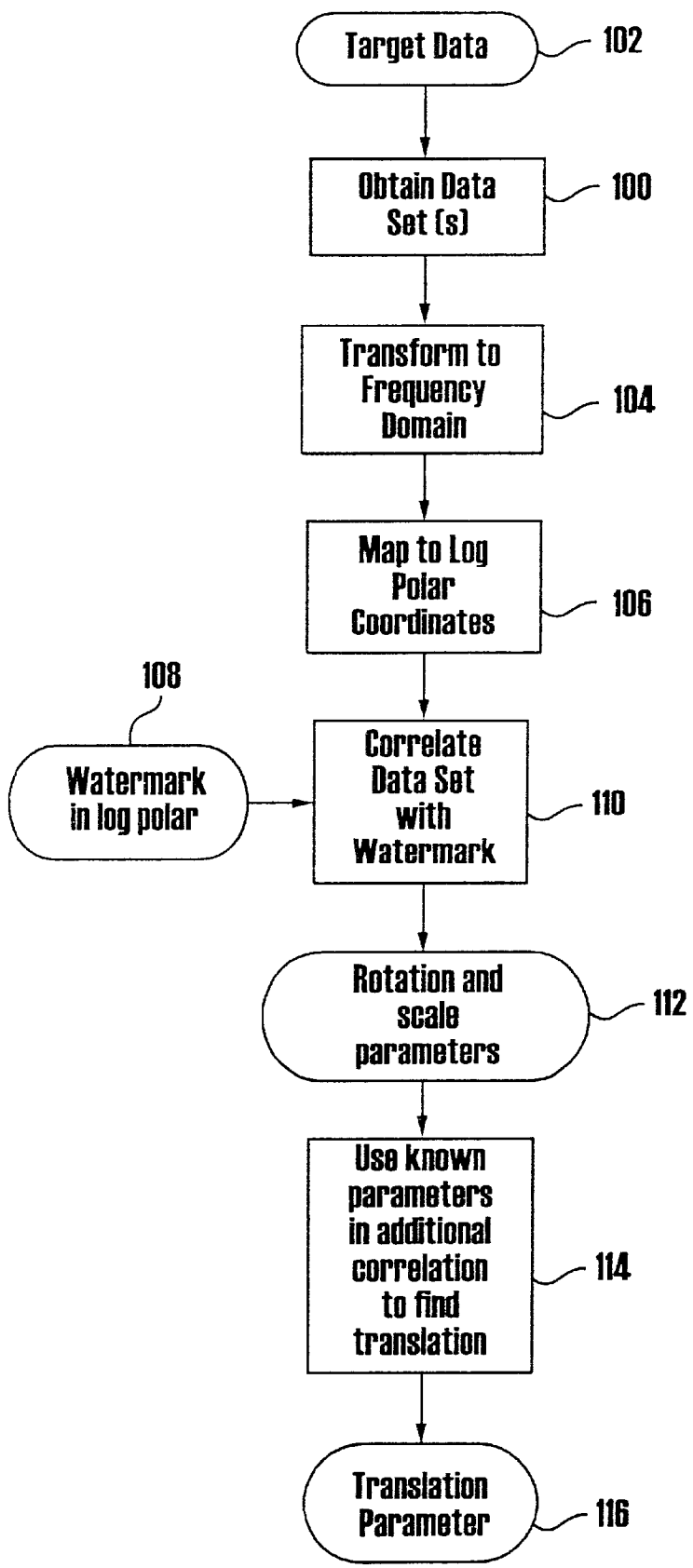
FIG. 1 is a flow diagram illustrating an overview of an implementation of a watermark detection process.

The following sections describe a watermark detection process that employs a Fourier Mellin Transform. For the purpose of this discussion, the process is adapted to detecting a watermark in an image. A similar process may be used for other empirical data sets such as audio and video. FIG. 1 is a flow diagram illustrating an overview of an implementation of the detection process. The following sections cross-reference the diagram through reference numbers.

The objective of the detection process shown in FIG. 1 is to determine whether a watermark is present, and if so, its orientation within the target image. The orientation approximates a geometric transform that the original media content has experienced as a result of intentional or unintentional corruption.

Capturing Data Sets

The detection process begins by capturing one or more data sets from the target data (100, 102). In the case of an image, the target data is an image (the target image 102), and the data sets are blocks of pixels taken from this image.

Transform Data Set to Frequency Domain

Next, the detection process transforms the data sets into the frequency domain (104). In particular, it performs a fourier transform of an image block from the spatial domain to a spatial frequency domain.

Noise Reduction Functions

The process may optionally apply one or more preprocessing functions to reduce the impact of unwanted noise on the detection process. For example, in one implementation, the detection process adds two or more image blocks together to increase the embedded signal to noise ratio (the addition may be performed in the spatial or some other transform domain). Filtering may also be employed to attenuate signal having little, if any, watermark information.

Transform to Log Polar Coordinate System

Next, the process transforms the data set (which may contain a transformed watermark) to a log polar coordinate system (106). By converting to the log polar domain, rotation and scale are converted to translation. One implementation performs a Fourier Mellin transform to map the data set from the spatial frequency domain to a logpolar coordinate system. For other types of signals, a similar mapping of the data set may be employed. For audio signals, the detector may perform a logarithmic sampling of audio data (e.g., a logarithmic sampling of frequency domain audio data) to convert scaling into translation. For video signals, the detector may perform a log-log-log transformation or a log-polar-log transformation of the two spatial coordinates (horizontal and vertical directions within an image), and temporal coordinates, respectively.

Correlation with the Watermark Pattern to Find Rotation and Scale

At this stage, the detection process correlates the watermark pattern (108) with the data set in the log-polar coordinate system to find rotation and scale parameters (110, 112). A variety of correlation processes may be used to implement this phase. For example, there is a general class of such correlation processes that are referred to as generalized matched filters. One implementation employs a generalized matched filter to determine the rotation and scale parameters for the block of interest. Alternatively, one may employ specialized correlation filters to perform correlation. The location in log polar space that provides the highest measure of correlation provides an estimate of the rotation and scale parameters.

Using Rotation and Scale to Get Translation

Having determined rotation and scale parameters, the detection process proceeds to conduct further correlation to find the translation parameter for the block of interest (114). Using the rotation and scale parameters as a starting point, the detection process conducts additional block matching on the spatial image data to determine the translation parameters (116). In particular, one implementation rotates and scales the block of interest and then searches the block to find the location within the block that most closely matches the watermark pattern. This location provides the translation parameters, e.g., the coordinates of a reference position within the block.

Example Implementation

Figure 2:
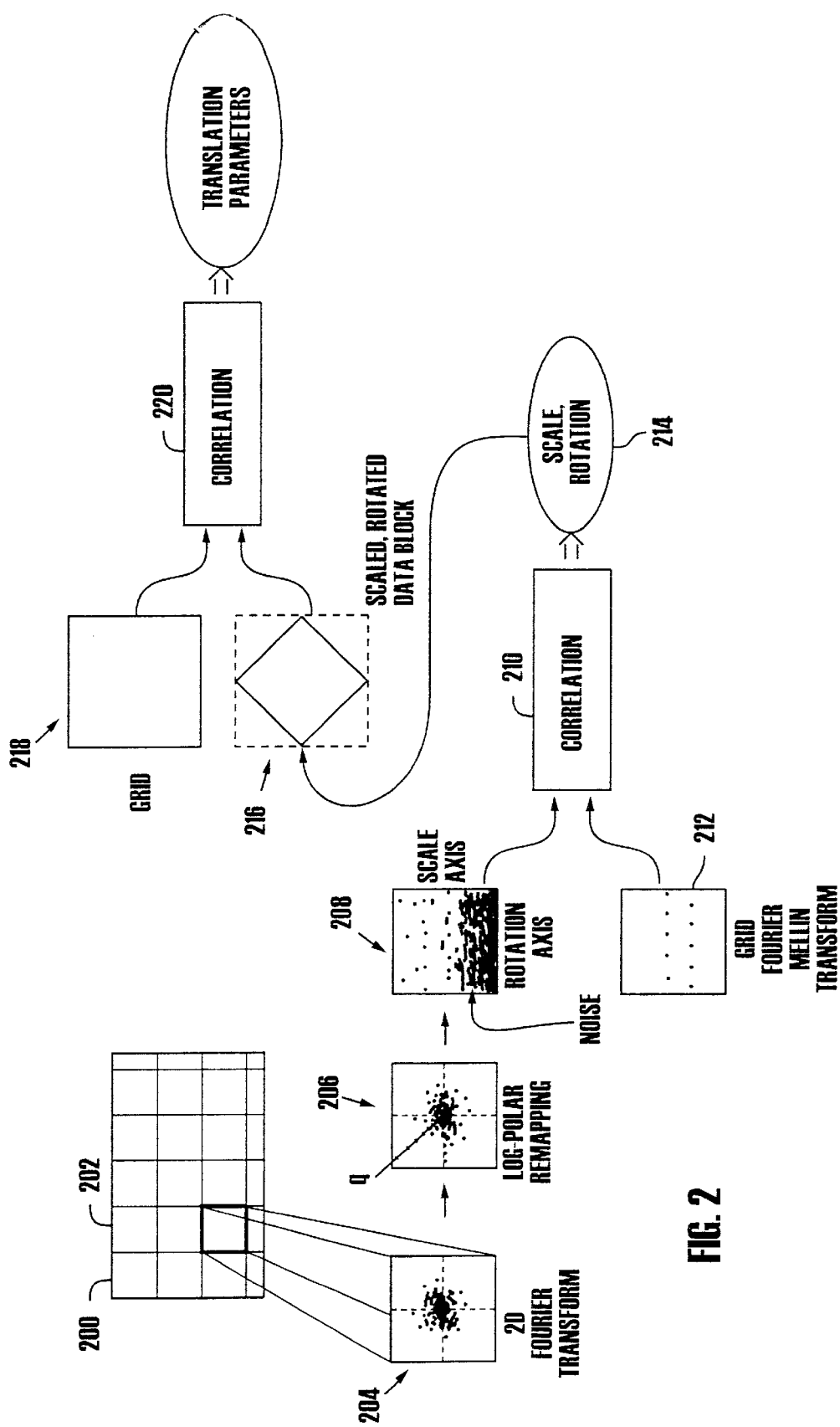
FIG. 2 depicts the detection process shown in FIG. 1 as applied to an image.

FIG. 2 depicts the detection process shown in FIG. 1 as applied to an image. In the detector implementation illustrated in FIG. 2, the target image is divided into blocks of pixels, which form the data sets for the detection process. The implementation supports blocks of varying sizes, but typically, they are N by N, such as 32 by 32, 64 by 64, 96, by 96, 128 by 128, etc. The detection process operates on these data sets to look for a watermark, and if one is identified, to compute an orientation vector.

Before elaborating on implementation details, it is helpful to begin with an overview of the watermark structure. As noted above, the watermark may be implemented in a variety of ways. In the context of images, for example, it may be applied to the original content in the spatial domain, in a frequency domain, or some combination of these domains. The specific values of the watermark used to alter discrete samples of the image may be expressed in the spatial or frequency domain. For example, the watermark samples may be expressed as having some value and location in the spatial and or frequency domain. In addition, the value of a watermark sample may be a function of position in a given domain and may be a function of the corresponding image sample that it alters. For example, it may be expressed as a "delta function" that alters the corresponding image sample depending on the value of that image sample. For additional description of watermark encoding, please see copending applications 09/503,881 and 09/452,021, which are hereby incorporated by reference.

Components of the watermark may perform the function of conveying information content, identifying the watermark's orientation, or both of these functions. The detection process is primarily concerned with the watermark's ability to identify its orientation.

Figure 3:
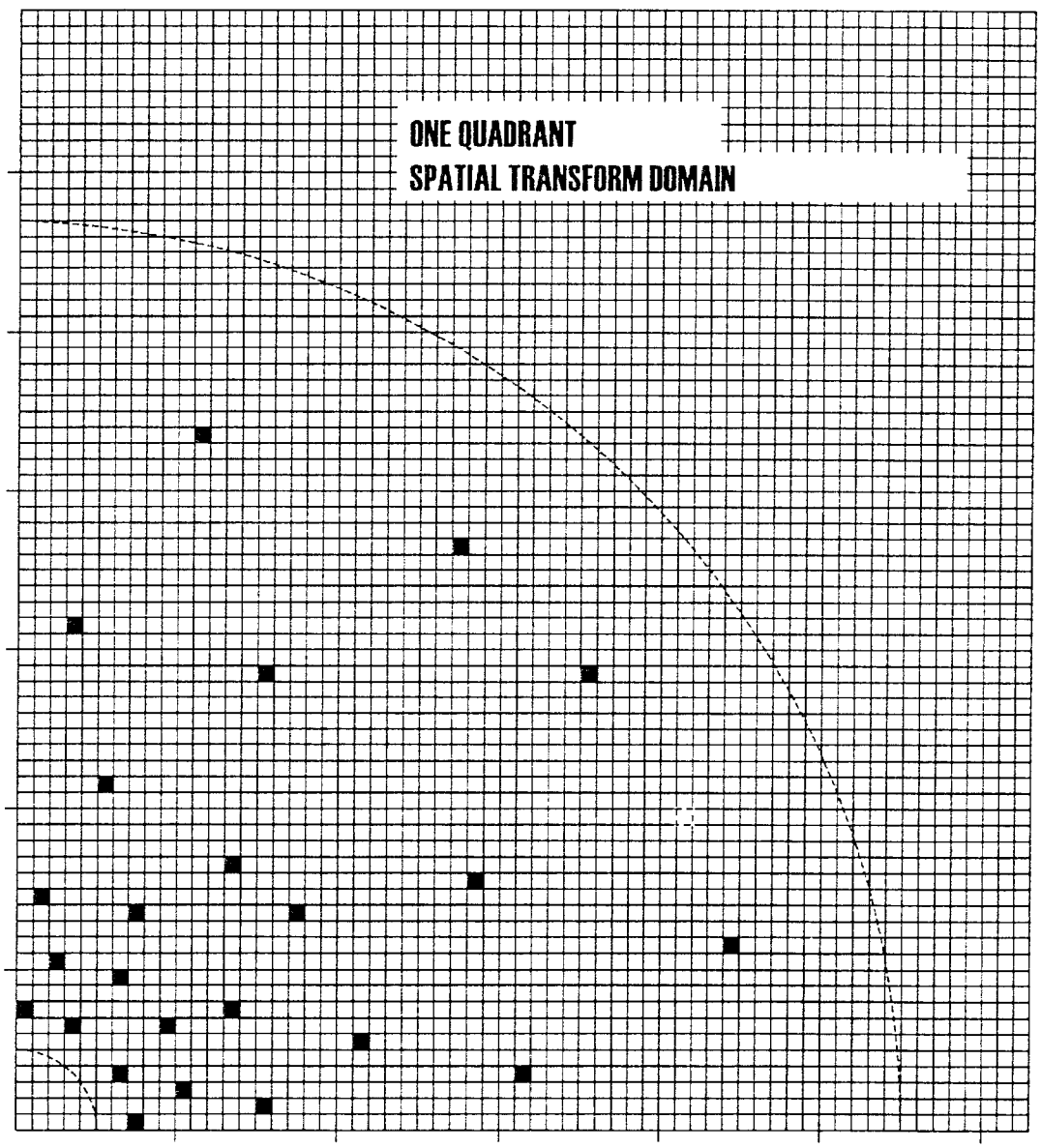
FIG. 3 illustrates an example of a watermark component used to identify the presence and orientation of the watermark in a target image.

The watermark used in the implementation illustrated in FIG. 2 has an orientation signal component that helps identify the watermark's orientation in a corrupted image. FIG. 3 illustrates one quadrant of an example orientation component in a spatial frequency domain, namely Fourier transform domain (other transform domains may be used as well). The points in the plot represent impulse functions (also referred to as orientation points), indicating signal content of the detection watermark signal. The pattern of orientation points for the illustrated quadrant is replicated in all four quadrants, though such quadrant replication is not necessary in all applications. There are a number of properties of the detection pattern that impact its effectiveness for a particular application. The selection of these properties is highly dependent on the application.

One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in a suspect signal, and aids in extracting the rotation angle. However, in the case of an octally symmetric pattern, the detector includes an additional step of testing which of the four quadrants the orientation angle falls into.

Also, impulse functions defined in the Fourier transform domain should have conjugate symmetry so that they map to a real image in the spatial domain.

The orientation points shown in the example of FIG. 3 are magnitude components in a frequency domain. In particular, FIG. 3 depicts a Fourier domain. However, in other implementations, an embedded signal component may be defined in other transform domains as well, such as a wavelet transform or Discrete Cosine Transform domain.

The impulse functions may have random, or more particularly, "pseudo random" phase. Pseudo random refers to the case where the impulse functions or other orientation signal components have random phase, yet the phase of each component is known. The known phase attributes enable automated detection processes to determine the position of a watermark in a suspect signal, even in cases where the signal has been translated (shifted, offset) subsequent to encoding of the watermark. This type of misregistration occurs, for example, where the detection process starts at some arbitrary location in an audio or image signal, or the signal has been clipped, shifted or offset.

Another criterion is the position of the orientation points and the frequency range that they reside in. Preferably, the orientation points fall in a mid frequency range. If they are located in a low frequency range, they may be noticeable in the watermarked image. If they are located in the high frequency range, they are more difficult to recover. Also, they should be selected so that scaling, rotation, and other manipulation of the watermarked signal does not push the orientation points outside the range of the detector. Finally, the orientation points should preferably not fall on the vertical or horizontal axes, and each orientation point should have a unique horizontal and vertical location.

While FIG. 3 depicts a two-dimensional orientation signal, orientation signals may be one dimensional (a one-dimensional signal, e.g., a set of impulses in one dimension, for audio signals) or have more than two dimensions (e.g., a collection of functions that span three dimensions such as a set of two-dimensional impulse functions as in FIG. 3 that change in position or magnitude over time).

As explained below, the detector performs correlation processes between this orientation pattern (or a transformed version of it) and transformed data sets extracted from the target image.

Returning to the process depicted in FIG. 2, the detector segments the target image into blocks (e.g., 200, 202) and then performs a 2-dimensional fast fourier transform (2D FFT) on each block. This process yields a 2D transform of the magnitudes of the image content of the block in the spatial frequency domain as depicted in the plot 204 shown in FIG. 2.

Next, the detector process performs a log polar sampling of the transformed block. The type of sampling in this implementation is referred to as a Fourier Mellin transform. The Fourier Mellin transform is a geometric transform that warps the image frequency domain data from a Cartesian Coordinate System to a log polar coordinate system. As depicted in the plot 206 shown in FIG. 2, this transform sweeps through the transformed image data along a line at angle θ, mapping the data to a log polar coordinate system shown in the next plot 208. The log polar coordinate system has a rotation axis, representing the angle θ, and a scale axis. Inspecting the transformed data at this stage, one can see the orientation points of the watermark begin to be distinguishable from the noise component of the image signal.

Next, the detector performs a correlation 210 between the transformed image block and the transformed orientation signal 212. At a high level, the correlation process slides the orientation signal over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match for the orientation pattern.

Figure 4:
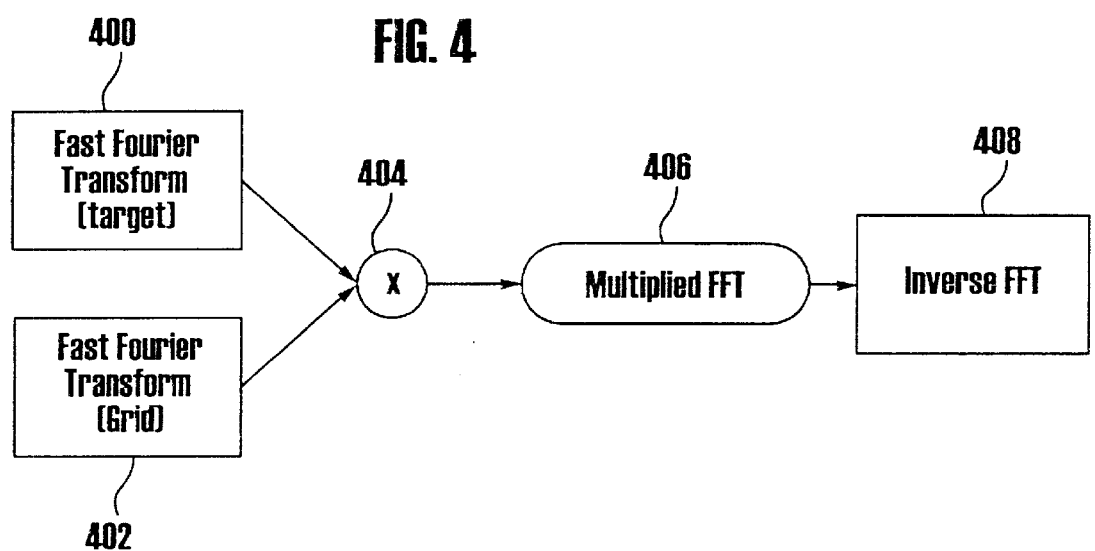
FIG. 4 illustrates an example of a generalized match filter used to correlate a watermark detection signal with a target image in the detection process.

There are a variety of ways to implement the correlation process. Any number of generalized matched filters may be implemented for this purpose. FIG. 4 depicts one such type of generalized matched filter. This filter, sometimes referred to as a Fourier Magnitude filter, performs an FFT on the target and the orientation signal (400, 402), multiplies the resulting arrays together to yield a multiplied FFT (406). The filtering operation is a form of convolution of the orientation signal with the target image. In particular, the filter repeatedly re-positions, multiplies the corresponding samples of the orientation signal and target, and accumulates the result at the corresponding location in the resulting array. Finally, it performs an inverse FFT (408) on the multiplied FFT to return the data into its original log-polar domain. The position or positions within this resulting array with the highest magnitude represent the candidates with the highest correlation.

When there are several viable candidates, the detector selects a set of the top candidates and applies an additional correlation stage. Each candidate has a corresponding rotation and scale parameter. The correlation stage rotates and scales the FFT of the orientation signal and performs a matching operation with the rotated and scaled orientation signal on the FFT of the target image. The matching operation multiplies the values of the transformed orientation signal (rotated and scaled) with sample values at corresponding positions in the Fourier magnitude data of the target image and accumulates the result to yield a measure of the correlation. The detector repeats this process for each of the candidates and picks the one with the highest measure of correlation. As shown in FIG. 2, the rotation and scale parameters (214) of the selected candidate are then used to find additional parameters that describe the orientation of the watermark in the target image.

The detector applies the scale and rotation to the target data block in the spatial domain 216 and then performs another correlation process between the orientation signal 218 and the scaled and rotated data block 216. The correlation process 220, in this example, is a generalized matched filter operation. It provides a measure of correlation for an array of positions that each has an associated translation parameter (e.g., an x, y position). Again, the location with the highest measure of correlation determines the translation parameters.

The phase attributes of an embedded code signal, such as the orientation signal, may be used to determine the position of the embedded code signal in a suspect media signal. Similarly, they may be used to determine translation of the media signal relative to its position at the time of encoding of the embedded code signal. Consider the case where the orientation signal has known phase attributes, such as components (e.g., impulse functions) with known phases. An example is the set of impulse functions with pseudo random phase described previously. To determine translation, the detector may apply phase only matching between the orientation signal and the suspect signal to find the location (or translation parameter(s)) where the phase attributes of both signals provide the best match. For example, matched filtering may be performed to determine the translation parameters (e.g., x and y position in a 2D signal) that provide the highest measure of correlation. Such phase matching may be performed in one (e.g., audio), two (e.g., image), or higher dimensional signals (e.g., video). This process may be used to determine the location of an embedded code signal in a suspect signal, and may also be used to determine a transformation that has been applied to a media signal subsequent to being encoded with the embedded code signal.

At this point, the detector has recovered the following orientation parameters: rotation, scale and translation. For many applications, these parameters may be sufficient to enable accurate reading of the watermark. In a watermark read operation, the reader applies the orientation parameters to re-orient the target image and then proceeds to extract the watermark signal. In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

Differential Scale

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the orientation signal or the target image with selected amounts of differential scale and picks the differential scale parameters that yield the best correlation.

Another approach to determination of differential scale is set forth in application Ser. No. 09/452,022.

Yet another approach is to perform log-log sampling to convert scale in each of two dimensions to translation in each of the two dimensions of the log-log sampled signal. Then, matched filtering between an orientation signal and the sampled signal can be used to find the scale parameters in each dimension that provide the best correlation.

Implementation Platforms

Figure 5:
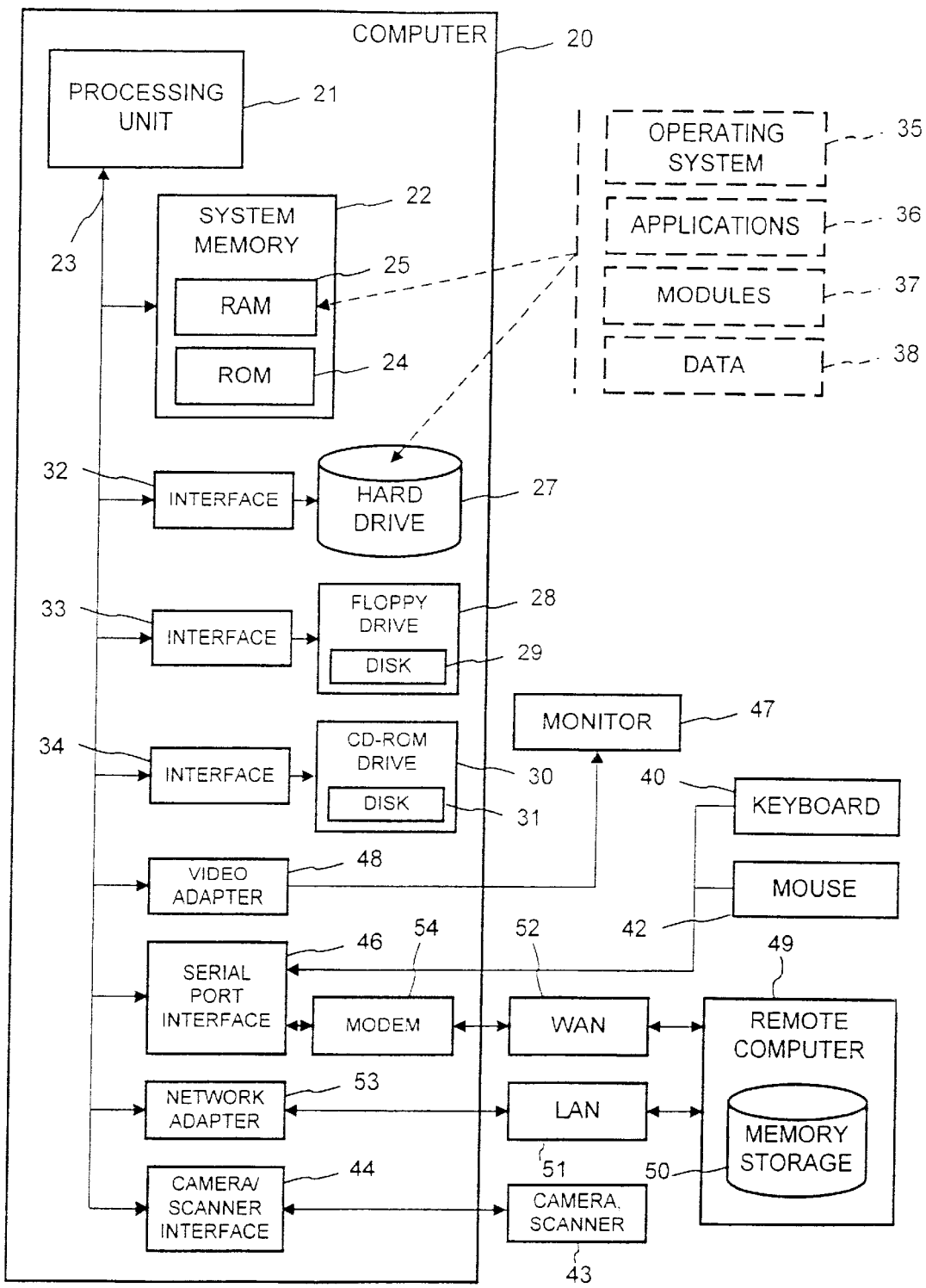
FIG. 5 illustrates a block diagram of a computer system that serves as an operating environment for an implementation of the invention.

FIG. 5 and the following discussion are intended to provide a brief, general description of a suitable computing environment in which the invention may be implemented. The invention is implemented in program modules comprising executable instructions that run on a computer. It may also be implemented in hardware (e.g., a ASIC) or a combination of hardware or software.

Generally, program modules include routines, programs, components, data structures, etc. that perform particular tasks or implement particular abstract data types. The invention may be ported to other computer system configurations, including handheld devices, multiprocessor systems, microprocessor-based or programmable consumer electronics, minicomputers, mainframe computers, and the like. The invention may also be implemented in distributed computing environments where tasks are performed by remote processing devices that are linked through a communications network. In a distributed computing environment, program modules may be located in both local and remote memory storage devices.

FIG. 5 illustrates an example of a computer system that serves as an operating environment for the invention. The computer system includes a computer 520, including a processing unit 521, a system memory 522, and a system bus 523 that interconnects various system components including the system memory to the processing unit 521.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 524 and random access memory (RAM) 525. A basic input/output system 526 (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions (program code such as dynamic link libraries, and executable files), etc. for the computer 520.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 525, including an operating system 535, one or more application programs 536, other program modules 537, and program data 538.

A user may enter commands and information into the personal computer 520 through a keyboard 540 and pointing device, such as a mouse 542. Other input devices may include a microphone, joystick, game pad, satellite dish, digital camera, scanner, or the like. A digital camera or scanner 543 may be used to capture the target image for the detection process described above. The camera and scanner are each connected to the computer via a standard interface 544. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

These and other input devices are often connected to the processing unit 521 through a serial port interface 546 that is coupled to the system bus, but may be connected by other interfaces, such as a parallel port, game port or a universal serial bus (USB).

A monitor 547 or other type of display device is also connected to the system bus 523 via an interface, such as a video adapter 548. In addition to the monitor, personal computers typically include other peripheral output devices (not shown), such as speakers and printers.

The computer 520 operates in a networked environment using logical connections to one or more remote computers, such as a remote computer 549. The remote computer 549 may be a server, a router, a peer device or other common network node, and typically includes many or all of the elements described relative to the computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the personal computer 520 typically includes a modem 54 or other means for establishing communications over the wide area network 552, such as the Internet. The modem 554, which may be internal or external, is connected to the system bus 523 via the serial port interface 546.

In a networked environment, program modules depicted relative to the personal computer 520, or portions of them, may be stored in the remote memory storage device. It will be appreciated that the network connections shown are exemplary and that other means of establishing a communications link between the computers may be used.

Concluding Remarks

Having described and illustrated the principles of the invention with reference to specific implementations, it will be recognized that the principles thereof can be implemented in many other, different, forms. For example, the nature of the orientation implemented in many other, different, forms. For example, the nature of the orientation parameters extracted during the detection process may vary. Also, the order in which these parameters are extracted may vary as well.

The specific matching techniques described above are only examples of suitable correlation processes. Instead of generalized matched filters, the correlation processes may be implemented using impulse matched filters. Some of the matching operations detailed above operate on data transformed into a frequency domain. The correlation processes may be performed in different domains, such as the spatial domain or temporal domain, and transform domains, including but not limited to wavelet, DCT, or Fourier transform domains.

To provide a comprehensive disclosure without unduly lengthening the specification, applicants incorporate by reference the patents and patent applications referenced above. The particular combinations of elements and features in the above-detailed embodiments are exemplary only; the interchanging and substitution of these teachings with other teachings in this and the incorporated-by-reference patents/applications are also contemplated.

We claim:

1. A method of determining a transformation of a media signal having an embedded code signal, the method comprising:
   performing a logarithmic sampling of the media signal to create a sampled signal in which scaling of the media signal is converted to translation in the sampled signal; and
   computing translation of the embedded code signal in the sampled signal to determine scaling of the media signal subsequent to the encoding of the embedded signal in the media signal.

2. The method of claim 1 wherein the embedded code signal comprises a set of impulse functions in a transform domain.

3. The method of claim 2 wherein the impulse functions are have random or pseudo random phase.

4. The method of claim 1 wherein phase attributes of the embedded code signal is used to compute translation.

5. The method of claim 4 wherein the media signal comprises an audio signal.

6. The method of claim 4 wherein the embedded code signal is comprised of two or more components, and the phase attributes comprises pseudo random phases of the two or more components.

7. The method of claim 6 wherein the two or more components comprise impulse functions in a transform domain.

8. The method of claim 7 wherein the media signal is an audio signal.

9. The method of claim 1 wherein the media signal comprises an audio signal.

10. The method of claim 1 wherein the logarithmic sampling is performed on transform domain data of the media signal.

11. The method of claim 1 wherein the embedded code signal comprises a set of impulse functions, the media signal is a two dimensional signal and including:
    performing a logarithmic sampling of each dimension of the media signal to create the sampled signal; and
    computing translation of the embedded code signal in the sampled signal to determine scaling of the media signal in each of the dimensions.

12. The method of claim 11 wherein the impulse functions are in a transform domain and logarithmic sampling is performed on transform domain data of the media signal.

13. The method of claim 1 wherein the embedded code signal comprises a set of impulse functions, the media signal is a three dimensional signal and including:
    performing a logarithmic sampling of each of the three dimensions of the media signal to create the sampled signal; and
    computing translation of the embedded code signal in the sampled signal to determine scaling of the media signal in each of the dimensions.

14. The method of claim 13 wherein the set of impulse functions are in a transform domain and the logarithmic sampling is performed on transform domain data of the media signal.

15. The method of claim 13 wherein the media signal comprises a sequence of video frames and the three dimensions comprise vertical and horizontal spatial dimensions in each frame and a temporal dimension of the sequence of frames.

16. The method of claim 1 wherein the media signal is a two dimensional signal and including:
    performing a logarithmic and polar sampling of the two dimensional signal to create the sampled signal in which both scaling and rotation of the two dimensional signal are converted to translation in the sampled signal; and
    computing translation of the embedded code signal in the sampled signal to determine scaling and rotation of the media signal.

17. The method of claim 16 wherein the logarithmic or polar sampling is performed on transform domain data of the media signal.

18. The method of claim 1 wherein the media signal is a sequence of video frames and including:
    performing a logarithmic and polar sampling of one or more frames and a logarithmic sampling of the temporal dimension of the sequence of frames to create sampled signals; and
    computing translation of the embedded code signal in the sampled signals to determine scaling and rotation of one or more frames and temporal scaling of the frames relative to the media signal at an encoding time of the embedded code signal.

19. A computer readable medium on which is stored software for performing the method of claim 1.

20. A method of determining orientation of an embedded code signal in a media signal that has been transformed since encoding of the embedded code signal in the media signal, the method comprising:

performing a logarithmic sampling of the media signal to create a sampled signal in which scaling of the media signal is converted to translation in the sampled signal; and computing translation of the embedded code signal in the sampled signal to determine scaling of the embedded code signal subsequent to the encoding of the embedded signal in the media signal.

21. The method of claim 20 wherein the embedded code signal comprises a set of impulse functions in a transform domain.

22. The method of claim 21 wherein the impulse functions have pseudo random phase.

23. The method of claim 20 wherein the media signal comprises an audio signal.

24. The method of claim 20 wherein the media signal is a two dimensional signal and including:

performing a logarithmic and polar sampling of the two dimensional signal to create the sampled signal; and computing translation of the embedded code signal in the sampled signal to determine scaling and rotation of the embedded code signal.

25. A computer readable medium on which is stored software for performing the method of claim 20.

26. A system for determining a transformation of a media signal having an embedded code signal, the method comprising:

means for performing a logarithmic sampling of the media signal to create a sampled signal in which scaling of the media signal is converted to translation in the sampled signal; and means for computing translation of the embedded code signal in the sampled signal to determine scaling of the media signal subsequent to the encoding of the embedded signal in the media signal.

27. The system of claim 26 wherein the media signal is an audio signal.

28. The system of claim 26 wherein the scaling of the media signal is used to determine orientation of the embedded code signal in the media signal.

* * * * *